US009112977B2

(12) United States Patent
Lennartsson (10) Patent No.: US 9,112,977 B2
(45) Date of Patent: Aug. 18, 2015

(54) VOICEMAIL MESSAGE BASED ON TEXT INFORMATION

(75) Inventor: Mats Peter Lennartsson, Sodra Sandby (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2142 days.

(21) Appl. No.: 11/734,939

(22) Filed: Apr. 13, 2007

(65) Prior Publication Data

US 2008/0253538 A1 Oct. 16, 2008

(51) Int. Cl.
*H04M 11/00* (2006.01)
*H04M 3/533* (2006.01)
*H04M 3/42* (2006.01)

(52) U.S. Cl.
CPC ...... *H04M 3/53383* (2013.01); *H04M 3/42374* (2013.01); *H04M 3/53391* (2013.01); *H04M 2201/60* (2013.01); *H04M 2203/2072* (2013.01)

(58) Field of Classification Search
CPC .............. H04M 3/53383; H04M 3/5333
USPC ......... 379/71, 76, 88.12, 88.13, 88.16, 88.18, 379/88.25–88.28, 88.17, 67.1, 88.19, 88.14, 379/202.01; 455/413, 412.2; 704/235, 275
See application file for complete search history.

(56) References Cited

U.S. PATENT DOCUMENTS

| 5,479,491 | A | * | 12/1995 | Herrero Garcia et al. | . 379/88.15 |
| 5,533,100 | A | * | 7/1996 | Bass et al. | 379/88.06 |
| 6,067,348 | A | * | 5/2000 | Hibbeler | 379/88.16 |
| 6,266,399 | B1 | * | 7/2001 | Weller et al. | 379/88.19 |
| 7,620,160 | B2 | * | 11/2009 | Tidwell et al. | 379/88.25 |
| 7,623,633 | B2 | * | 11/2009 | Gatzke et al. | 379/88.12 |
| 7,778,858 | B1 | * | 8/2010 | Daily et al. | 705/7.15 |
| 2002/0025026 | A1 | * | 2/2002 | Gerszberg et al. | 379/67.1 |
| 2002/0039408 | A1 | | 4/2002 | Hall et al. | |
| 2002/0178002 | A1 | * | 11/2002 | Boguraev et al. | 704/235 |
| 2003/0008638 | A1 | * | 1/2003 | Worley et al. | 455/413 |
| 2004/0008827 | A1 | * | 1/2004 | Martin et al. | 379/67.1 |
| 2005/0091056 | A1 | | 4/2005 | Surace et al. | |
| 2005/0101303 | A1 | * | 5/2005 | Pelaez et al. | 455/413 |
| 2006/0223502 | A1 | | 10/2006 | Doulton | 455/413 |

(Continued)

FOREIGN PATENT DOCUMENTS

| GB | 2 217 953 A | 11/1989 |
| GB | 2 325 111 A | 11/1998 |
| WO | WO 2006/036258 | 4/2006 |
| WO | WO 2008005924 A2 * | 1/2008 |

OTHER PUBLICATIONS

International Search Report and Written Opinion dated Apr. 14, 2008 issued in corresponding PCT application No. PCT/IB2007/054168, 13 pages.

(Continued)

*Primary Examiner* — Fan Tsang
*Assistant Examiner* — Van D Huynh
(74) *Attorney, Agent, or Firm* — Snyder, Clark, Lesch & Chung, LLP (57) ABSTRACT

A voicemail system includes logic to convert a personal greeting or personal announcement received to a corresponding automated voice communication, logic to associate the corresponding automated voice communication to a call situation, and logic to play the corresponding automated voice communication when the call situation occurs.

20 Claims, 10 Drawing Sheets

(56) References Cited

U.S. PATENT DOCUMENTS

| | | |
|---|---|---|
| 2007/0003028 A1 | 1/2007 | Korah et al. |
| 2007/0032222 A1* | 2/2007 | Koch .......................... 455/412.2 |
| 2007/0036294 A1* | 2/2007 | Chaudhuri et al. ........ 379/88.16 |
| 2009/0068993 A1* | 3/2009 | Allen ............................ 455/413 |
| 2010/0049528 A1* | 2/2010 | Zeinstra et al. ............... 704/275 |
| 2010/0150322 A1* | 6/2010 | Yin et al. .................. 379/88.14 |
| 2013/0058471 A1* | 3/2013 | Garcia ..................... 379/202.01 |

OTHER PUBLICATIONS

Written Opinion of the International Preliminary Examining Authority dated Jul. 16, 2009 issued in corresponding PCT application No. PCT/IB2007/054168, 6 pages.

\* cited by examiner

VOICEMAIL MESSAGE BASED ON TEXT INFORMATION

BACKGROUND

Description of Related Art

The versatility of existing voicemail systems has grown tremendously within the past decade, particularly in terms of access and management. However, users of existing voicemail systems are still hampered by setting up voicemail features, such as voice greetings and voice announcements. There are two common approaches to setting up this aspect of the voicemail system. In the first approach, the voicemail system records a greeting message or an announcement message as vocalized by the user. In the second approach, the voicemail system provides a generic greeting message or a generic announcement message. The generic greeting message or the generic announcement message may be spoken by an automated voice of the voicemail system. The generic greeting message or the generic announcement message may include recordings of key words, such as the user's name and telephone number, spoken by the user and correspondingly injected into appropriate segments of the generic greeting or announcement message. Nevertheless, these automated voice messages may contain only basic information.

The task of constructing a greeting message or an announcement message can be cumbersome. Users may be uncomfortable with recording a greeting or announcement message on the voicemail system because they mispronounce words or include unnecessary words (e.g., "er", "um"), they dislike the sound of their voice, or they may have difficulty in constructing a precise message without rambling. Unfortunately, existing voicemail systems lack the capability to afford users to create greeting or announcement messages in a more user friendly way.

SUMMARY

According to one aspect, a communication system may include a voicemail system of a network. The voicemail system may include logic to convert personal greeting or personal announcement information originating from a use to a corresponding automated voice communication, logic to associate the corresponding automated voice communication to a call situation, and logic to play the corresponding automated voice communication to a calling party when the call situation occurs.

Additionally, where the personal greeting or personal announcement information is text, the logic to convert may be configured to convert the text to the corresponding automated voice communication.

Additionally, where the personal greeting or personal announcement information is speech, the logic to convert may be configured to convert the speech to corresponding text, and convert the corresponding text to the corresponding automated voice communication.

Additionally, the logic to convert may be configured to generate the corresponding automated voice communication based on a user's selection of preferences relating to characteristics of the automated voice.

Additionally, the logic to associate may be configured to define the call situation based on a user's selection of preferences relating to the call situation.

According to another aspect, a voicemail system may include logic to convert text to a corresponding automated voice communication, logic to associate the corresponding automated voice communication to a call situation, and logic to retrieve the corresponding automated voice communication when the call situation occurs.

Additionally, the logic to retrieve may include logic to play the corresponding automated voice communication when the call situation occurs.

Additionally, the logic to retrieve may include logic to forward the corresponding automated voice communication to a device or communication system when the call situation occurs.

Additionally, the logic to convert may be configured to generate the corresponding automated voice communication based on a user's selection of preferences relating to characteristics of the automated voice.

Additionally, the preferences may include options for selecting celebrity voices.

Additionally, the voicemail system may include a processing unit, a memory, and a voicemail database, where the logic to associate may be configured to associate the corresponding automated voice communication to the call situation based on a user's selection of preferences stored in the voicemail database.

According to yet another aspect, a voicemail system may include logic to convert speech to a corresponding automated voice communication, logic to associate the corresponding automated voice communication to an incoming call situation, and logic to retrieve the corresponding automated voice communication when the incoming call situation occurs.

Additionally, the logic to retrieve may include logic to play the corresponding automated voice communication when the incoming call situation occurs.

Additionally, the logic to retrieve may include logic to forward the corresponding automated voice communication to a device or communication system when the incoming call situation occurs.

Additionally, the automated voice message may be a personal greeting.

Additionally, the logic to convert may include logic to convert speech to corresponding text, and logic to convert the corresponding text to the corresponding automated voice communication.

According to a further aspect, a voicemail system may include means for converting speech or text to a corresponding automated voice communication, means for associating the corresponding automated voice communication to an incoming call situation, means for retrieving the corresponding automated voice communication from a voicemail database when the incoming call situation occurs.

Additionally, the means for converting may include means for converting speech to corresponding text, and means for converting the corresponding text to the corresponding automated voice communication.

Additionally, the means for retrieving may include means for retrieving and playing the automated voice communication, and means for retrieving and forwarding the automated voice communication to a device or communication system.

According to a further aspect, a computer-readable medium having stored sequences of instructions which, when executed by at least on processor, cause the at least one processor to convert text or speech to a corresponding automated voice communication, associate the corresponding automated voice communication to a call situation, and retrieve the corresponding automated voice communication when the call situation occurs.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the following detailed description does not limit the invention.

Overview

Implementations described herein may provide a voicemail system that allows a user to create his/her own automated voice communications based on text or speech the user sends to the voicemail system. For example, in one implementation, text-to-speech logic of the voicemail system may convert received text to a corresponding automated voice communication. In another implementation, speech-to-text logic of the voicemail system may convert received speech to corresponding text. Subsequently, text-to-speech logic of the voicemail system may convert the corresponding text to a corresponding automated voice communication. In both implementations, once an automated voice communication is created, the user may selectively associate the automated voice communication to any given call situation, such as to greet callers leaving the user a message. However, other implementations may be employed in which the sequence of converting and receipt of user selections may vary from the above.

Figure 1:
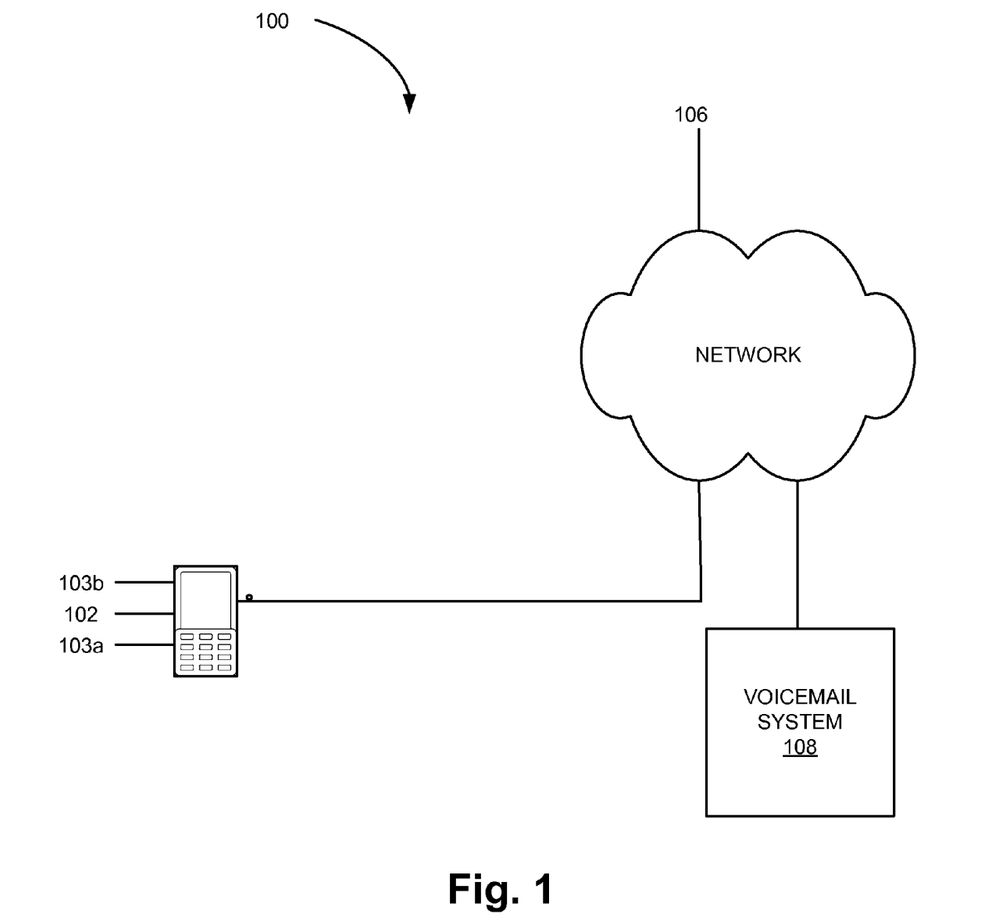
FIG. 1 is a diagram of an exemplary communication system.

FIG. 1 illustrates an exemplary communication system 100 including a user device 102 having keypad 103a and display 103b, network 106, and voicemail system 108. User device 102 may include any device capable of communicating with network 106, either directly or indirectly (e.g., via another device, node, network). User device 102 may include one or more entities. An entity may be defined as a device, such as a telephone, a mobile phone, a personal computer, a personal digital assistant (PDA), a laptop, or another type of computation or communication device, a thread or process running on one of these devices, and/or an object executable by one of these devices. Keypad 103a may include any component capable of providing input to the user device 102. For example, keypad 103a may include a standard telephone keypad, a keyboard, and/or a set of function keys. Display 103b may include any component capable of providing visual information to the user. For example, display 103b may display text input into user device 102, text and/or graphics (e.g., a short message service (SMS) signal) received from an external source (e.g., network 106), and/or information regarding incoming or outgoing calls or text messages, media, games, phone books, address books, the current time, etc.

Network 106 may include one or more series of points or nodes interconnected by communication paths or links. For example, network 106 may include a local area network (LAN), a wide area network (WAN), the Internet, an intranet, a telephone network (e.g., the PSTN or a cellular network) or a combination of networks.

Voicemail system 108 may include any device or combination of devices capable of providing voicemail service functionality. For example, voicemail system 108 may include one or more nodes of network 106, or a component(s) thereof, capable of communication with user device 102. Alternatively, for example, voicemail system 108 may include a component of a user device, or associated with a user device (e.g., an answering machine) and provide voicemail service functionality for the user device.

Although FIG. 1 illustrates exemplary components of communication system 100, in other implementations, communications system 100 may contain fewer, different, or additional components than those depicted in FIG. 1.

As illustrated in FIG. 1, a user of user device 102 may establish communication, directly or indirectly, with network 106 and/or voicemail system 108. The user of user device 102 may be a subscriber of voicemail service and may communicate with voicemail system 108 to access and manage, for example, a voicemail box (not illustrated). In particular, the user of user device 102 may create an automated voice communication that may be associated with any particular call situation. However, other implementations may be possible. For example, the user of user device 102 may establish communication with an e-mail service that may communicate with voicemail system 108. Thus, numerous implementations may be realized given the advances in communication services available to users.

The description to follow will describe exemplary voicemail systems. In practice, implementations of a voicemail system may include, for example, hardware, software, combinations of hardware and software, or hybrid architectures, in order to realize voicemail service functionality.

Exemplary Devices

First Exemplary Voicemail System

Figure 2:
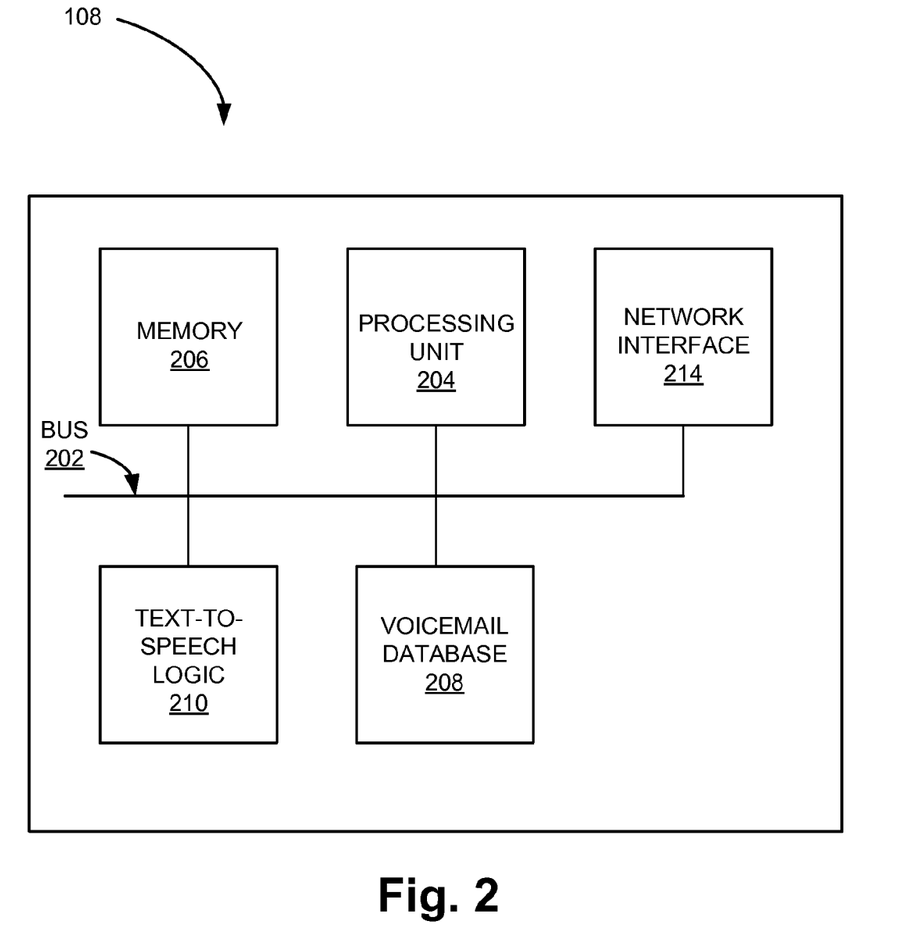
FIG. 2 is a diagram of first exemplary components of the voicemail system of FIG. 1.

FIG. 2 is a diagram of first exemplary components of voicemail system 108. As illustrated in FIG. 2, voicemail system 108 may include bus 202, processing unit 204, memory 206, voicemail database 208, text-to-speech logic 210, and network interface 214. For discussion purposes only, consider voicemail system 108 as a node (e.g., voicemail server) in communication system 100 of FIG. 1.

Bus 202 may permit communication among the components of voicemail system 108. Although not illustrated, other buses may be included, such as system, local, and/or address.

Processing unit 204 may include a microprocessor, a data processor, a network processor, an application specific integrated circuit (ASIC), a programmable logic device (PGA), or another type of processing logic that may interpret and execute instructions. "Logic", as the term is used herein, may include hardware (e.g., ASIC, a field programmable gate array (FPGA)), software, a combination of hardware and software, or hybrid architectures. Processing unit 204 may control operation of voicemail system 108 and its components. Instructions used by processing unit 204 may also be stored in a computer-readable medium accessible by or provided within processing unit 204. A computer-readable medium may include one or more memory devices and/or carrier waves. In an implementation where a computer-readable medium is employed, instructions used by processing unit 204 may also include instructions associated with text-to-speech logic 210

Memory 206 may include random access memory (RAM), read only memory (ROM), programmable read only memory (PROM), hard drive, and/or removable storage medium and its corresponding drive to store data and/or instructions that may be used by processing unit 204, or other components of voicemail system 108.

Voicemail database 208 may include user preference information (e.g., characteristics of automated voice, call situation information), message information (e.g., greetings, announcements), subscriber information (e.g., profile information, level and type of service), and/or other information relating to voicemail services.

Text-to-speech logic 210 may include any logic that converts text to speech. For example, text-to-speech logic 210 may receive text and employ a text-to-speech model to recognize the received text and convert it to a corresponding automated voice (i.e., a synthetic voice) communication. Text-to-speech logic 210 may perform additional features other than strictly converting text to a corresponding automated voice communication. For example, text-to-speech logic 210 may correct misspelled words.

Network interface 214 may include any device to allow voicemail system 108 to communicate with other devices and/or systems (e.g., other nodes of a network). For example, network interface 214 may include mechanisms for communicating with another device or system via a network, such as network 106 of FIG. 1.

Although FIG. 2 illustrates a variety of components for voicemail system 108, in other implementations, voicemail system 108 may include fewer, different, or additional components.

Voicemail system 108 may perform operations in response to processing unit 204 executing instructions contained in memory 206. The instructions may also be read into memory 206 from another device via network interface 214. The instructions contained in memory 206 may cause processing unit 204 to perform processes that will be described later. Alternatively, hardwired circuitry may be used in place of or in combination with software instructions to implement processes described herein. Thus, implementations described herein are not limited to any specific combination of hardware circuitry and software. For example, processing unit 204, in cooperation with the other components, may provide an interactive communication session with user device 102 to create, for example, a greeting based on text received. Text received by voicemail system 108 may be processed by text-to-speech logic 210. Text-to-speech logic 210 may generate an automated voice communication. The automated voice communication may be stored in voicemail database 208. Voicemail system 108 may retrieve and forward the automated voice communication (e.g., to a calling party's user device) when a call situation occurs. Alternatively, or additionally, voicemail system may retrieve and play the automated voice communication when a call situation occurs.

Second Exemplary Voicemail System

Figure 3:
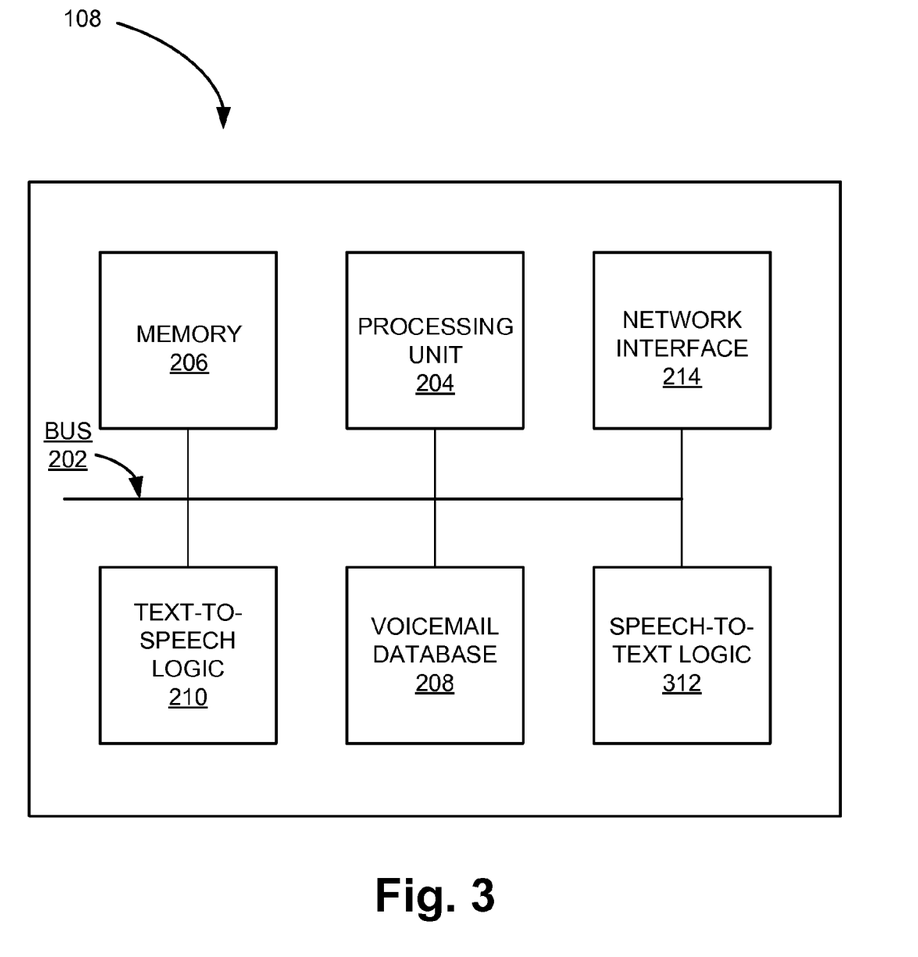
FIG. 3 is a diagram of second exemplary components of the voicemail system of FIG. 1.

FIG. 3 is a diagram of second exemplary components of voicemail system 108. Voicemail system 108 may include bus 202, processing unit 204, memory 206, voicemail database 208, text-to-speech logic 210, speech-to-text logic 312, and network interface 214. As illustrated in FIG. 3, voicemail system 108 may contain many similar components to voicemail system 108 illustrated in FIG. 2. However, voicemail system 108 of FIG. 3 also may include speech-to-text logic 312. Thus, no further discussion relating to the similar components is provided.

Speech-to-text logic 312 may include any logic that converts speech to text. For example, speech-to-text logic 312 may receive speech and employ a speech recognition model to recognize the received speech and convert it to corresponding text. Speech-to-text logic 312 may perform additional features other than strictly converting speech to corresponding text. For example, speech-to-text logic 312 may omit unnecessary words (e.g., "er", "um"). As will be discussed further below, speech may include, for example, a user's speech or an audio file.

For discussion purposes only, second exemplary components of voicemail system 108 are being described as a node (e.g., voicemail server) in communication system 100 of FIG. 1. Voicemail system 108 may perform operations in response to processing unit 204 executing instructions contained in memory 206. The instructions may also be read into memory 206 from another device via network interface 214. The instructions contained in memory 206 may cause processing unit 204 to perform processes that will be described later. Alternatively, hardwired circuitry may be used in place of or in combination with software instructions to implement processes described herein. Thus, implementations described herein are not limited to any specific combination of hardware circuitry and software. For example, processing unit 204, in cooperation with the other components, may provide an interactive communication session with user device 102 to create, for example, a greeting based on speech received. Speech received by voicemail system 108 may be processed by speech-to-text logic 312. Speech-to-text logic 312 may generate corresponding text. The text may be stored in voicemail database 208. Text-to-speech logic 210 may generate an automated voice communication corresponding to the text. The automated voice communication may be stored in voicemail database 208. Voicemail system 108 may retrieve and forward the automated voice communication (e.g., to a calling party's user device) when a call situation occurs. Alternatively, or additionally, voicemail system may retrieve and play the automated voice communication when a call situation occurs.

The second exemplary components of voice mail system 108 may also permit a user to create a greeting based on text only, similar to the first exemplary components of voicemail system 108 of FIG. 2.

Exemplary Methods

Figure 4:
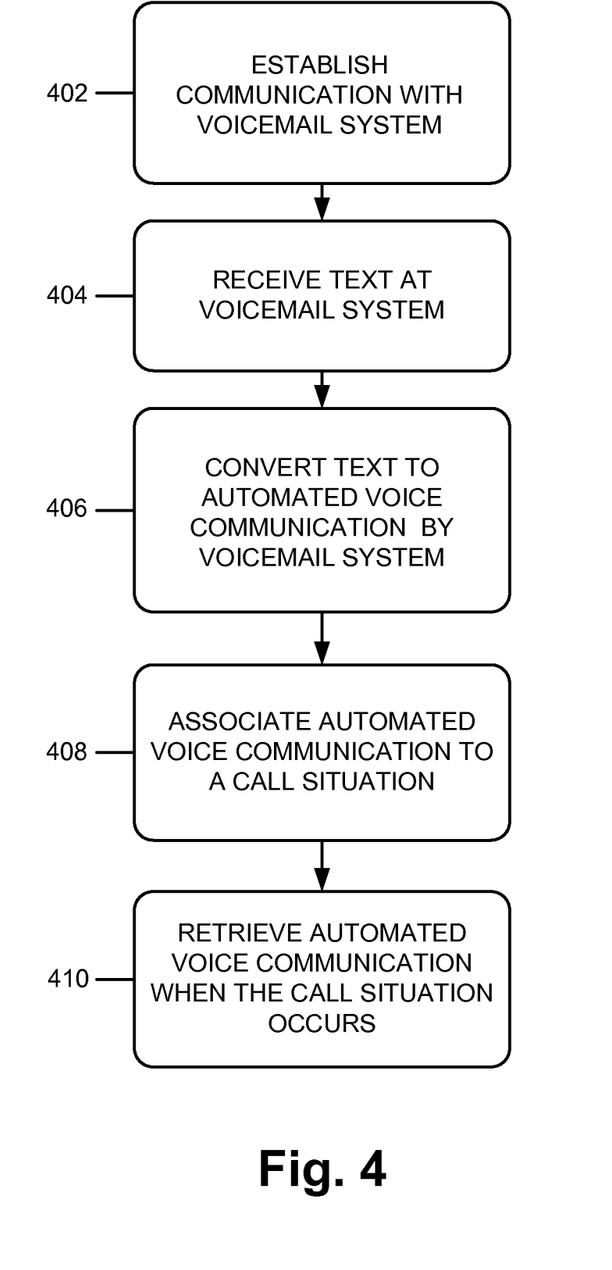
FIGS. 4 and 5 depict flow charts of exemplary processes for generating a voicemail message.

FIG. 4 depicts a flow chart of a first exemplary process. In particular, FIG. 4 illustrates an exemplary procedure for setting up an automated voice communication, such as a greeting, on voicemail system 108 of FIG. 2 or voicemail system 108 of FIG. 3.

Block 402

Establish communication with voicemail system 108. For example, initially, a user of user device 102 may establish communication with voicemail system 108. For example, the user of user device 102 may establish communication with voicemail system 108 via network 106, as illustrated in FIG. 1. For discussion purposes only, the user of user device 102 is also a subscriber of voicemail system 108. However, other implementations may be possible. For example, as previously mentioned above, the user of user device 102 may establish communication with, for example, an e-mail or fax service that may forward communications (e.g., text)(refer to block 404) to voicemail system 108. Thus, the user of user device 102 may establish communication with voicemail system directly, or indirectly.

In one implementation the user of user device 102 may contact voicemail system 108 and navigate to, for example, a set-up menu of voicemail system 108. Voicemail system 108 may permit the user to establish a message. For example, the user may be creating a greeting for the first time, deleting an existing greeting and replacing it with a new greeting, adding an additional greeting (e.g., having a first greeting for unknown callers, and a second greeting for known callers). Unlike other voicemail systems that limit the user to either record his/her speech or settle for a generic, automated voice greeting, voicemail system 108 may allow the user of user device 102 to create a personal greeting based on text.

Depending on the capabilities of user device 102, the user may, for example, enter text by using keypad 103*a*. Alternatively, the user may have previously stored text on, for example, a data card (e.g., a subscriber identification module (SIM) card, user identification module (UIM) card, etc.) or a USB flash drive, that may be accessed by user device 102. In another approach, the user may have previously created text on his/her computer, and may have previously stored the text on user device 102. In yet another approach, user device 102 may include a voice-to-text program that allows the user to create text. In still yet another approach, the voicemail system 108 may be, for example, an answering machine, in which case text may be inputted manually or read from a data card.

While the above-mentioned approaches are exemplary in nature, other approaches may be implemented. "Text" is not limited to, for example, a .txt file. Rather, voicemail system 108 may accept other formats, such as .pdf, .html, rich text, .doc. In addition, the user may send text to voicemail system 108 via other communication services, such as an e-mail service (e.g., where the text is an e-mail), simple message service (SMS) (e.g., where the text is a SMS message) and/or a fax service (e.g., where the text is a fax).

Block 404

Receive text at voicemail system 108. For example, voicemail system 108 may receive the text based on some form of direct or indirect communication from the user, as discussed above.

Block 406

Convert text to the automated voice communication by voicemail system 108. For example, text-to-speech logic 210 may convert the received text to a corresponding automated voice communication. The user may be prompted by voicemail system 108, for example, to select various parameters associated with the automated voice, such as gender, accent, language, voice speed, etc. Voicemail system 108 may also include a list of male or female voices, including celebrity voices, from which the user may select. Voicemail system 108 may play the automated voice message for the user to confirm the content and overall quality.

Block 408

Associate the automated voice communication to a call situation. For example, voicemail system 108 may prompt the user to designate when or in what circumstance(s) (i.e., call situation) the automated voice communication may be used. More particularly, there may be a particular call situation that a user may wish to have a corresponding automated voice communication played, or alternatively, retrieved and forwarded. For example, a user may wish to have a greeting played when the user does not recognize the caller, and does not wish to answer the call. Alternatively, or additionally, the user may wish to have an announcement message played when the user recognizes the caller, but does not wish to answer the call, such as "I am in a meeting right now, call me back this afternoon." Hence, voicemail system 108 may allow the user to create various automated voice communications that correspond to various call situations.

In one implementation, voicemail system 108 may categorize these automated voice communications, as for example, a greeting or an announcement, to simplify the set-up process.

In another implementation, voicemail system 108 may not categorize these automated voice communications, but allow the user to simply designate what automated voice communication will be played in any given call situation based on certain parameters (e.g., whether the caller is known or not known, whether the user is available or not available, the telephone number of the incoming call, the time of day, etc.).

Block 410

Retrieve automated voice communication when the call situation occurs. For example, voicemail system 108 may permit the user to select what operation voicemail system 108 is to perform when the call situation occurs. For example, voicemail system 108 may retrieve and play the automated voice communication. Alternatively, voicemail system 108 may retrieve and forward the automated voice communication, such as to another device or to another communication service.

Figure 5:
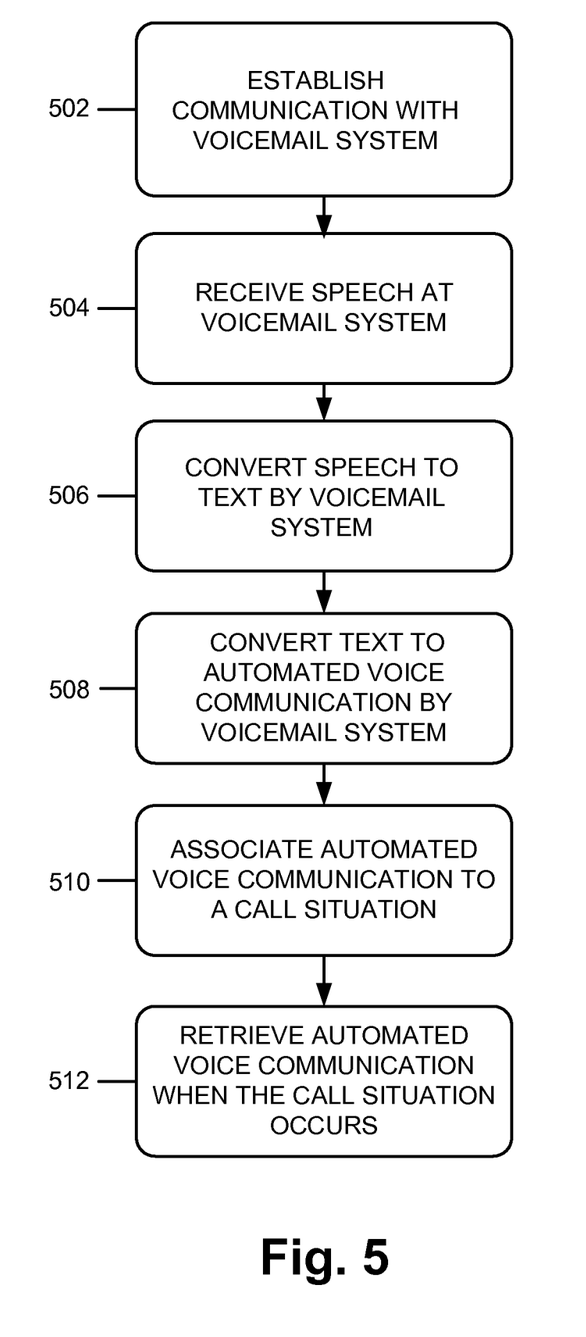

FIG. 5 depicts a flow chart of a second exemplary process. In particular, FIG. 5 illustrates an exemplary procedure for setting up a message, such as a greeting, on voicemail system 108 of FIG. 3.

Block 502

Establish communication with voicemail system 108. For example, initially, a user of user device 102 may establish communication with voicemail system 108. For example, the user of user device 102 may establish communication with voicemail system 108 via network 106, as illustrated in FIG. 1. For discussion purposes only, the user of user device 102 is also a subscriber of voicemail system 108. However, other implementations may be possible. For example, as previously mentioned above, the user of user device 102 may establish communication with, for example, an e-mail service that may forward communications (e.g., an audio file)(refer to block 504) to voicemail system 108. Thus, the user of user device 102 may establish communication with voicemail system directly, or indirectly.

Once the user of user device 102 has navigated to, for example, a set-up menu of voicemail system 108, voicemail system 108 may request that the user establish a message. For example, to establish a greeting, the user may be creating a greeting for the first time, deleting an existing greeting and replacing it with a new greeting, adding an additional greeting (e.g., having a first greeting for unknown callers, and a second greeting for known callers). Unlike other voicemail systems that limit the user to either record his/her speech or settle for a generic, automated voice greeting, voicemail system 108 may allow the user of user device 102 to create a personal greeting based on speech.

Voicemail system 108 may prompt the user of user device 102 for speech. The user may vocalize (speak) his/her speech to voicemail system 108. Alternatively, the user may have previously stored an audio file on, for example, a data card (e.g., a SIM) card or (UIM) card), or a USB flash drive, that may be accessed by user device 102. In another approach, the user may have previously created an audio file on his/her computer, and may have previously stored the audio file on user device 102. In yet another approach, user device 102 may include logic that records the user's speech and stores it as an audio file. Voicemail system 108 may accept a variety of audio file formats, such as .wav, .mp3., or .wma.

While the above-mentioned approaches are exemplary in nature, other approaches may be implemented.

Block 504

Receive speech at voicemail system 108. For example, voicemail system 108 may receive the speech based on some form of direct or indirect communication from the user, as discussed above. For example, if the user decides to vocalize (speak) his/her speech, voicemail system 108 may record the user's speech. Alternatively, voicemail system 108 may receive an audio file.

Block 506

Convert speech to text by voicemail system 108. For example, voicemail system 108 may receive the speech (e.g., spoken or an audio file), and speech-to-text logic 312 may convert the speech to corresponding text. Given the advances in speech-to-text logic, "training" of speech-to-text logic 312 may be unnecessary, and also human hesitations (e.g., "um", "er") may be detected and omitted, thus providing the user another simple way to create text.

Block 508

Convert text to the automated voice communication by voicemail system 108. For example, text-to-speech logic 210 may convert the received text to a corresponding automated voice communication. The user may be prompted by voicemail system 108, for example, to select various parameters associated with the automated voice, such as gender, accent and language, voice speed, etc. Voicemail system 108 may also include a list of male or female voices, including celebrity voices, which the user may select. Voicemail system 108 may play the automated voice message for the user to confirm the content and overall quality.

Block 510

Associate the automated voice communication to a call situation. For example, voicemail system 108 may prompt the user to designate when or in what circumstance(s) (i.e., call situation) the automated voice communication may be used. More particularly, there may be a particular call situation that a user may wish to have a corresponding automated voice communication be played, or alternatively, retrieved and forwarded. For example, a user may wish to have a greeting played when the user does not recognize the caller, and does not wish to answer the call. Alternatively, or additionally, the user may wish to have an announcement message to be played when the user recognizes the caller, but does not wish to answer the call, such as "I am in a meeting right now, call me back this afternoon." Hence, voicemail system 108 may allow the user to create various automated voice communications that correspond to various call situations.

In one implementation, voicemail system 108 may categorize these automated voice communications, as for example, a greeting or an announcement, to simplify the set-up process. In another implementation, voicemail system 108 may not categorize these automated voice communications, but allow the user to simply designate what automated voice communication will be played in any given call situation based on certain parameters (e.g., whether the caller is known or not known, whether the user is available or not available, the telephone number of the incoming call, the time of day).

Block 512

Retrieve the automated voice communication when the call situation occurs. For example, voicemail system 108 may permit the user to select what operation the voicemail system is to perform when the call situation occurs. For example, voicemail system 108 may retrieve and play the automated voice communication. Alternatively, voicemail system 108 may retrieve and forward the automated voice communication, such as to another device or to another communication service.

EXAMPLE

Figure 6A:
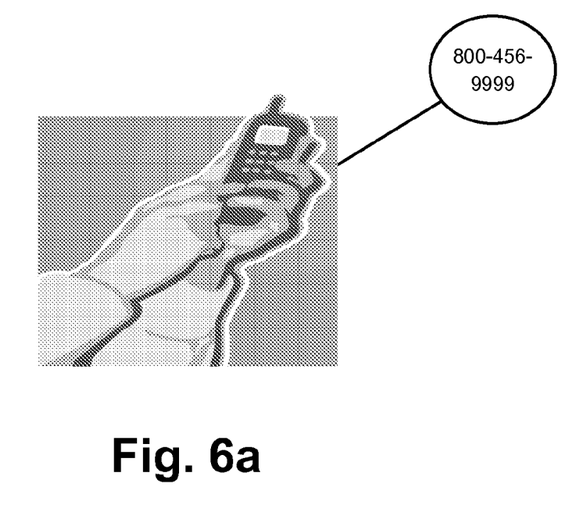
FIGS. 6a-6j are flow diagrams illustrating the processes of FIG. 4 or FIG. 5.
Figure 6B:
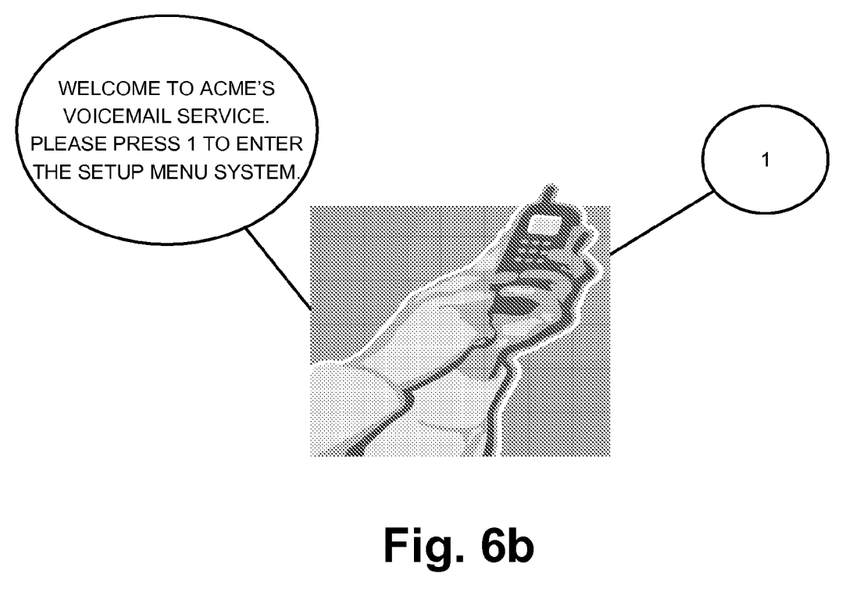
Figure 6C:
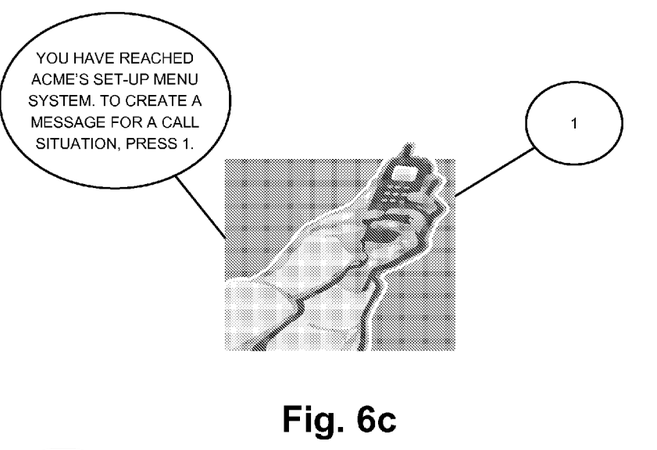
Figure 6D:
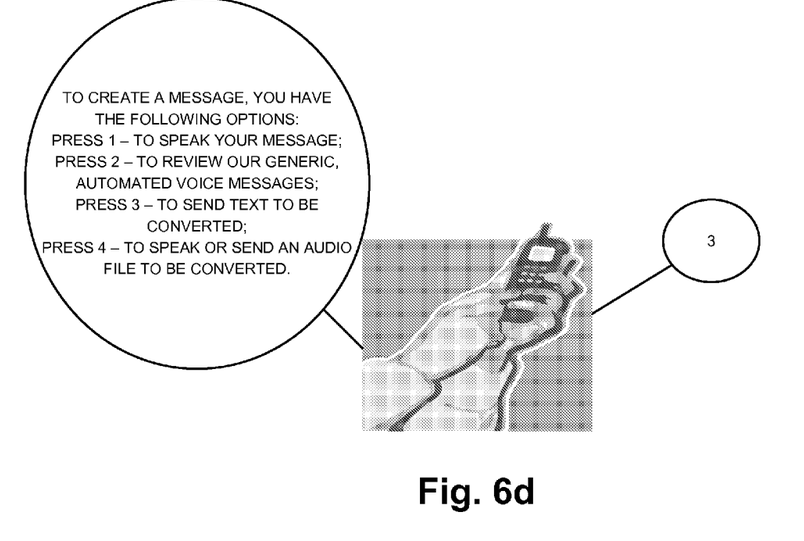
Figure 6E:
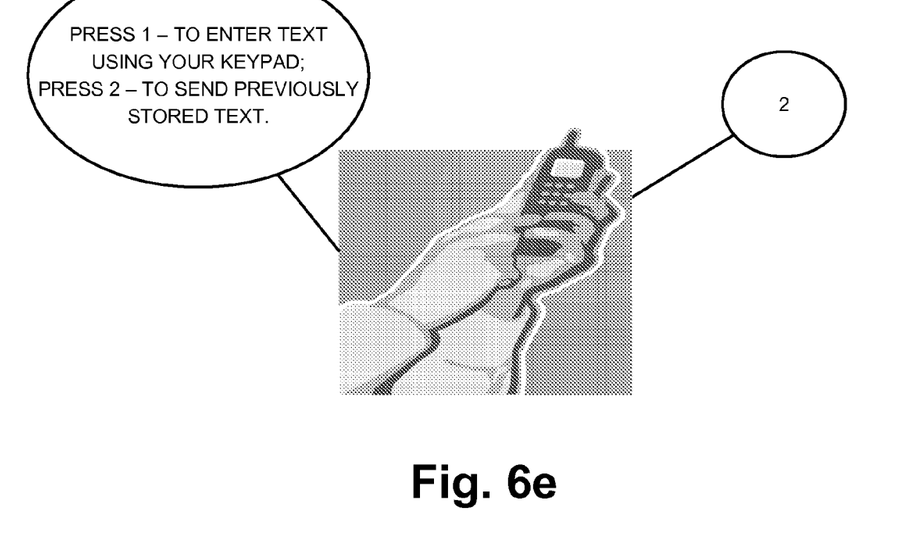
Figure 6F:
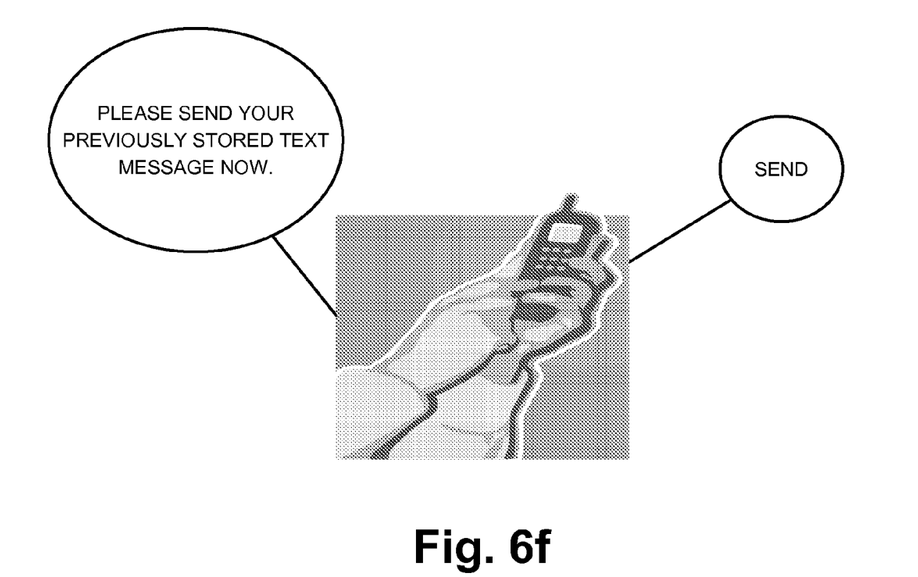
Figure 6G:
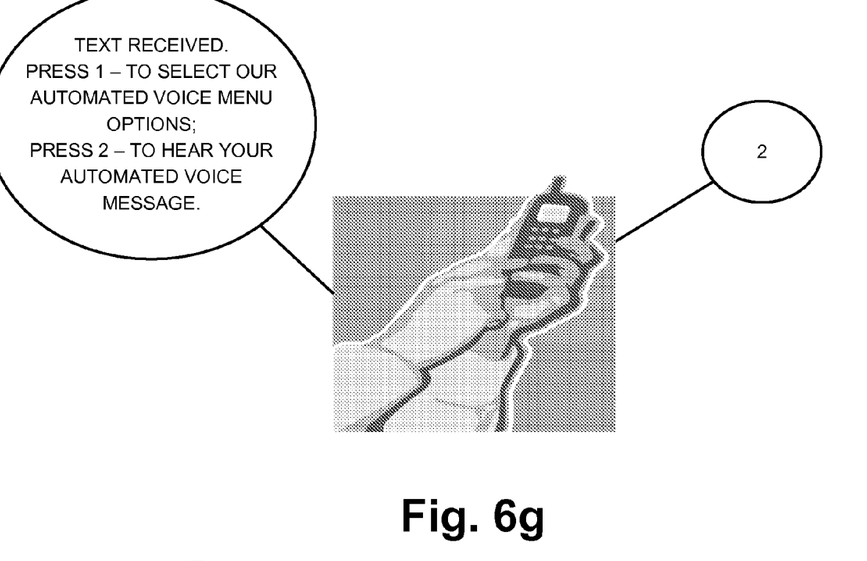
Figure 6H:
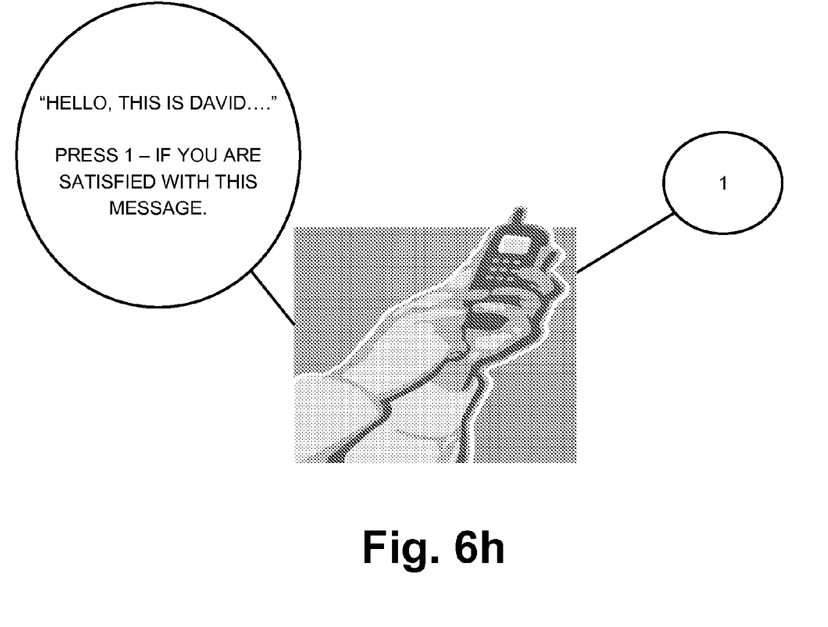
Figure 6I:
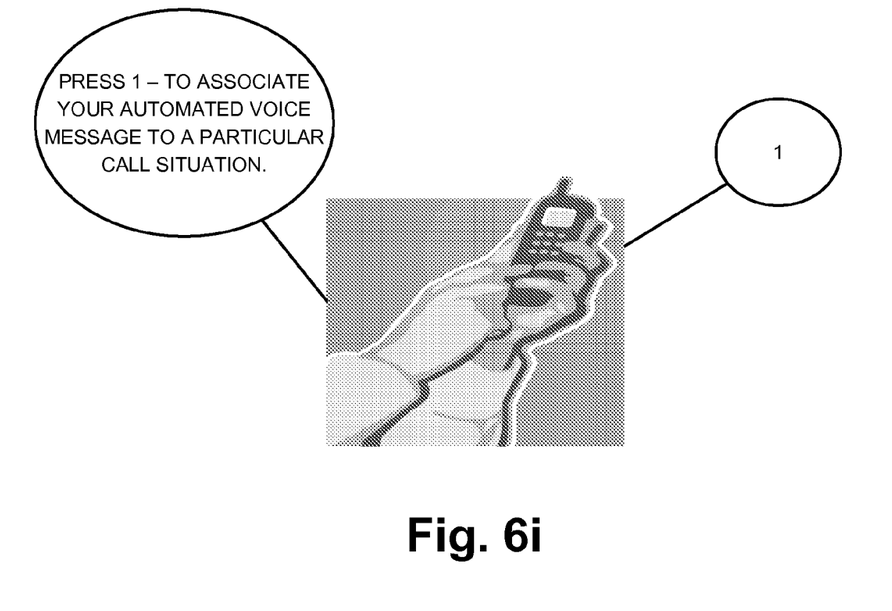
Figure 6J:
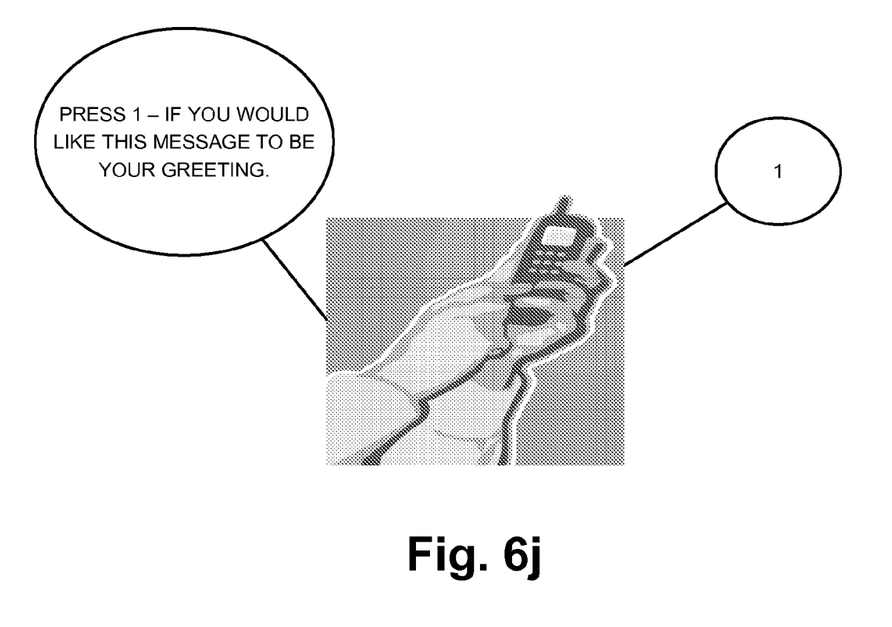

FIGS. 6a-6j are flow diagrams illustrating exemplary processes that may be associated with FIG. 4 or FIG. 5. FIG. 6a depicts a user operating a multimodal device (e.g., a device capable of operating in multiple modes, like data and voice). The user may establish communication with voicemail system 108 by dialing a telephone number. FIG. 6b depicts the user navigating to a set-up menu of voicemail system 108 by selecting "1". Now that the user has reached the set-up menu, FIG. 6c depicts voicemail system 108 requesting whether the user wishes to create a message for a call situation. The user responds by pressing "1" to indicate a desire to create a message. FIG. 6d depicts voicemail system 108 presenting the user with various options in which he/she may create a message, including sending text or speech to be converted. The user responds by pressing "3" to indicate a desire to send text to be converted. FIG. 6e depicts voicemail system 108 presenting the user with options in which text may be sent. As previously discussed, other implementations (not illustrated) may be performed. The user responds by pressing "2" to indicate a desire to send previously stored text. FIG. 6f depicts the user sending previously stored text to voicemail system 108 by pressing "send". FIG. 6g depicts the user wishing to hear the corresponding automated voice communication by pressing "2". FIG. 6h depicts the playing of the automated voice communication. In this example, assume that the user is satisfied with the content and quality of the automated voice communication and selects "1" to proceed. FIG. 6i depicts voicemail system 108 requesting the user to associate the automated voice communication to a particular call situation. The user responds by pressing "1" to indicate a desire to associate the automated voice communication to a call situation. FIG. 6j depicts the user selecting "1" so that the automated voice communication is played as a greeting.

As previously discussed other implementations and menu options may be available.

Conclusion

Implementations described herein may provide a user of a voicemail system greater versatility in creating automated voice communications (e.g., greetings, announcements).

The foregoing description of exemplary embodiments provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 4 and FIG. 5, the order of the blocks may be modified in other implementations. Further, non-dependent blocks may be performed in parallel.

It should be emphasized that the term "comprises" or "comprising" when used in the specification is taken to specify the presence of stated features, integers, steps, or components but does not preclude the presence or addition of one or more other features, integers, steps, components, or groups thereof.

While certain components have been described as being implemented within voicemail system 108, this need not be the case. In other implementations, one or more of these components may be implemented within another device, such as user device 102. For example, user device 102 may include text-to-speech logic 210 and/or speech-to-text logic 312.

It will be apparent that aspects, as described above, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware could be designed to implement these aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A communication system, comprising:
one or more devices, of a voicemail system, to:
receive, from a user via a network, an audio file stored at the user device, wherein the audio file includes recorded speech;
convert the recorded speech into text;
convert, using a synthetic voice, the text to a corresponding automated voice greeting that includes characteristics of gender and accent that are based on preferences selected by a user of the voicemail system;
associate the corresponding automated voice greeting with at least one call parameter associated with receiving a call, from a calling party and via the voicemail system, for the user, wherein the calling party is different than the user; and
forward, via a data message, the corresponding automated voice greeting to the calling party when the call corresponds to the at least one call parameter.

2. The communication system of claim 1, wherein the automated voice greeting includes characteristics of voice speed based on preferences selected by the user.

3. The communication system of claim 1, wherein when associating the corresponding automated voice greeting with the at least one call parameter, at least one of the one or more devices is further configured to:
define the at least one call parameter based on selection, by the user, of preferences relating to the at least one call parameter.

4. The communication system of claim 1, wherein the recorded speech comprises the user's voice.

5. A voicemail system, comprising:
logic to receive, from a user device via a network, as audio file including a recorded speech;
logic to convert the recorded speech into text;
logic to convert the text, using a synthetic voice at the voicemail system, to a corresponding automated voice greeting that includes characteristics of at least one of gender, accent, or voice speed based on preferences selected by the user;
logic to associate the corresponding automated voice greeting with at least one call parameter associated with receiving one or more messages via the voicemail system;
logic to retrieve the corresponding automated voice greeting when a call corresponds to at least one call parameter; and
logic to forward, via a date message, the corresponding automated voice greeting to a calling party prior to receiving, from the calling party and via the voicemail system, a message from the calling party.

6. The voicemail system of claim 5, wherein the logic to forward comprises:
logic to forward the corresponding automated voice greeting to a device or a communication system associated with the calling party.

7. The voicemail system of claim 5, wherein the logic to convert is further configured to:
generate the corresponding automated voice greeting based on a selection, received from a user associated with the audio file, of preferences relating to the synthetic voice of the automated voice greeting.

8. The voicemail system of claim 7, wherein the preferences include options for selecting celebrity voices for the synthetic voice.

9. The voicemail system of claim 5, further comprising:
a processing unit;
a memory; and
a voicemail database, wherein the logic to associate is configured to:
associate the corresponding automated voice greeting to the at least one call parameter based on a selection, received from a user associated with the audio file, of preferences stored in the voicemail database.

10. A voicemail system, comprising:
logic to convert speech to a corresponding automated voice greeting, comprising:
logic to receive, from the user device via a network, an audio file including a user's recorded speech,
logic to convert the recorded speech to corresponding text,
logic to receive the user's selection of one or more preferences relating to voice characteristics including at least one of a gender, an accent, or a voice speed, and
logic to convert the corresponding text to the corresponding automated voice greeting based on the one or more preferences;
logic to associate the corresponding automated voice greeting with an incoming call situation, wherein the incoming call situation is associated with providing a voicemail service of the voicemail system;
logic to retrieve the corresponding automated voice greeting when the incoming call situation occurs; and
logic to forward, via a data message, the retrieved corresponding automated greeting when the incoming call situation occurs.

11. The voicemail system of claim 10, wherein the logic to forward comprises:
logic to forward the corresponding automated voice greeting to a device or a communication system when the incoming call situation occurs.

12. The voicemail system of claim 10, wherein the corresponding automated voice greeting includes a personal greeting, of a user of the voicemail system, that is forward to one or more calling parties prior to receiving, from the one or more calling parties and via the voicemail system, voicemails for the user.

13. The voicemail system of claim 10, further comprises:
logic to receive an audio file including the speech, whereon the speech comprises a recording of the user's voice, wherein the logic to convert speech further comprises:
logic to determine whether the recorded speech includes one or more words of a particular type, and
logic to omit, when the recorded speech includes one or more words of the particular type, the one or more words from the corresponding text.

14. The voicemail system of claim 13, wherein the particular type comprises interjections, and wherein the logic to convert speech further comprises:
logic to detect at least one interjection in the recorded speech, and
logic to omit the at least one interjection from the recorded speech.

15. A voicemail system, comprising:
  means for converting information, that is received as an audio file via a network form a user of the voicemail system and that includes a recording of the user's speech, into text;
  means for receiving the user's selection of one or more preferences relating to voice characteristics including at least one of a gender or an accent;
  means for converting the text to a corresponding synthetic voice greeting based on the one or more preferences;
  means for associating the corresponding synthetic voice greeting with an incoming call parameter associated with the user;
  means for retrieving the corresponding synthetic voice greeting form a voicemail database when the incoming call parameter corresponds to an incoming call to a voicemail system; and
  means for forwarding, via a data message, the retrieved corresponding voice greeting in responding to the incoming call.

16. The voicemail system of claim 15, wherein the characteristics further include a voice speed.

17. The voicemail system of claim 15, wherein the means for forwarding comprises:
  means for forwarding the corresponding synthetic voice greeting to a device or a communication system associated with the incoming call.

18. A non-transitory computer-readable medium including instructions which, when executed by at least one processor, cause the at one processor to perform a method, the method comprising:
  receiving, at a voicemail system via a network, an audio file including recorded speech of a user sent from a user device;
  converting the recorded speech into text;
  converting the text, using a synthetic voice, to a corresponding automated voice greeting;
  retrieving the corresponding automated voice greeting when a call is received at the voicemail system for the user; and
  forwarding, via a data message, the corresponding automated voice greeting responsive to the call.

19. The non-transitory computer-readable medium of claim 18 wherein converting the recorded speech comprises:
  determining whether the recorded speech includes one or more words of a particular type, and
  omitting, when the recorded speech includes one or more words of the particular type, the one or more words from the text.

20. The non-transitory computer-readable medium of claim 19, wherein the particular type comprises interjections, and wherein converting the recorded speech further comprises:
  detecting at least one interjection in the recorded speech, and
  omitting the at least one interjection from the recorded speech.

* * * * *